(12) United States Patent
Chen et al.

(10) Patent No.: US 12,447,466 B2
(45) Date of Patent: Oct. 21, 2025

(54) PREPARATION METHOD OF Co@CM MULTI-CHANNEL CERAMIC CATALYTIC MEMBRANE FOR HYDROGENATION OF p-NITROPHENOL

(71) Applicant: NANJING TECH UNIVERSITY, Nanjing (CN)

(72) Inventors: Rizhi Chen, Nanjing (CN); Guodong Shao, Nanjing (CN); Yan Du, Nanjing (CN); Jiuxuan Zhang, Nanjing (CN); Hong Jiang, Nanjing (CN); Weihong Xing, Nanjing (CN)

(73) Assignee: NANJING TECH UNIVERSITY, Nanjing (CN)

( * ) Notice: Subject to any disclaimer, the term of this patent is extended or adjusted under 35 U.S.C. 154(b) by 0 days.

(21) Appl. No.: 19/215,411

(22) Filed: May 22, 2025

(65) Prior Publication Data
US 2025/0281919 A1 Sep. 11, 2025

Related U.S. Application Data

(63) Continuation of application No. PCT/CN2023/119304, filed on Sep. 18, 2023.

(30) Foreign Application Priority Data

Sep. 1, 2023 (CN) .......................... 202311123064.6

(51) Int. Cl.
| | | |
|---|---|---|
| *B01J 31/18* | (2006.01) | |
| *B01J 31/16* | (2006.01) | |
| *B01J 31/28* | (2006.01) | |
| *B01J 35/45* | (2024.01) | |
| *B01J 35/59* | (2024.01) | |
| *B01J 37/02* | (2006.01) | |
| *B01J 37/06* | (2006.01) | |
| *B01J 37/08* | (2006.01) | |
| *B01J 37/16* | (2006.01) | |
| *C07C 215/76* | (2006.01) | |

(52) U.S. Cl.
CPC ....... *B01J 31/1805* (2013.01); *B01J 31/1616* (2013.01); *B01J 31/28* (2013.01); *B01J 35/45* (2024.01); *B01J 35/59* (2024.01); *B01J 37/0228* (2013.01); *B01J 37/06* (2013.01); *B01J 37/08* (2013.01); *B01J 37/16* (2013.01); *C07C 215/76* (2013.01); *B01J 2231/646* (2013.01); *B01J 2531/845* (2013.01)

(58) Field of Classification Search
None
See application file for complete search history.

(56) References Cited

U.S. PATENT DOCUMENTS

2020/0269208 A1 8/2020 Way et al.

FOREIGN PATENT DOCUMENTS

| CN | 102091626 A | 6/2011 |
|---|---|---|
| CN | 102274757 A | 12/2011 |
| CN | 106000459 A | 10/2016 |
| CN | 108079994 A | 5/2018 |
| CN | 113289666 A | 8/2021 |
| CN | 115155326 A | 10/2022 |

OTHER PUBLICATIONS

Angelika Gratzfeld-Huesgen, et al., Agilent 1200 Series Rapid Resolution LC and Rapid Resolution LC/MS Optimization Guide, Agilent Technologies, 2009, pp. 1-132.

*Primary Examiner* — Yun Qian
(74) *Attorney, Agent, or Firm* — Bayramoglu Law Offices LLC (57) ABSTRACT

A preparation method of a Co@CM multi-channel ceramic catalytic membrane for hydrogenation of p-nitrophenol is provided. In the catalytic membrane, a multi-channel ceramic membrane is adopted as a substrate. A cobalt salt as an active component is loaded in situ on a surface and in pores of the multi-channel ceramic membrane through a forced circulation with the help of the excellent reduction and anchoring effects of dopamine (DA), and then subjected to in situ self-reduction through calcination to produce the Co@CM multi-channel ceramic catalytic membrane. The preparation method has the following advantages: Nanoscale Co particles are loaded instead of a precious metal on a multi-channel ceramic membrane, and the surface of the Co particles is wrapped by carbon and nitrogen, which can effectively inhibit the loss of Co particles during a reaction. In addition, there is no need to add an additional reducing agent during the reduction of Co.

1 Claim, 3 Drawing Sheets

PREPARATION METHOD OF Co@CM MULTI-CHANNEL CERAMIC CATALYTIC MEMBRANE FOR HYDROGENATION OF p-NITROPHENOL

CROSS REFERENCE TO THE RELATED APPLICATIONS

This application is a continuation application of International Application No. PCT/CN2023/119304, filed on Sep. 18, 2023, which is based upon and claims priority to Chinese Patent Application No. 202311123064.6, filed on Sep. 1, 2023, the entire contents of which are incorporated herein by reference.

TECHNICAL FIELD

The present disclosure belongs to the technical field of membrane catalysis, and relates to a preparation method of a Co@CM multi-channel ceramic catalytic membrane for hydrogenation of p-nitrophenol.

BACKGROUND

Nitrophenols are persistent organic pollutants commonly found in plasticizers, pesticides, dyes, and pharmaceuticals. The long-term exposure to p-nitrophenol-containing wastewater can cause organ damage, blood disorders, dysfunction of endocrine systems, etc. in humans or animals. p-Aminophenol, as the primary reduction product from p-nitrophenol, is an important chemical and pharmaceutical intermediate. p-Aminophenol is widely used in the synthesis of antipyretics and analgesics, paracetamol, rubber additives, dyes, petroleum additives, etc. Therefore, the reduction of p-nitrophenol into p-aminophenol is of great significance in the industrial production and environmental protection. The existing catalysts for hydrogenation of p-nitrophenol include precious metal and non-precious metal catalysts. The precious metal catalysts are expensive and easy to lose during a reaction, which limits the large-scale application of precious metal catalysts. The non-precious metal catalysts, such as Ni-based and Co-based catalysts, have attracted widespread attention due to low prices. However, the traditional catalysts are typically powder catalysts, which are difficult to be separated from products due to small particle sizes.

Membrane catalysis technology is a combination of catalytic reactions and product separation. That is, a catalytic active component is loaded on a surface or in pores of a membrane to produce a catalytic membrane with catalytic properties, which can achieve the in-situ separation of a reaction material from a catalyst. The patent (ZL 201010617062.9) discloses a preparation method of a catalytic membrane. This preparation method is as follows: a ceramic membrane support is first subjected to amino modification, then immersed in an ionic solution of palladium as an active component, and then subjected to chemical reduction to produce the catalytic membrane. This preparation method improves the catalytic activity of the catalyst. However, due to the weak binding of the precious metal to the membrane material, the precious metal tends to lose during a reaction, resulting in poor stability of the catalytic membrane. Moreover, compared with a powder catalyst, the catalytic membrane has a low content of the active component per unit volume, resulting in low catalytic activity. Therefore, the weak binding of metal ions to supports and the low contents of active components are the key problems restricting the application of catalytic membranes.

Polydopamine (PDA) includes a large number of active groups, such as phenolic hydroxyl groups and amino groups, and can be combined with metal ions through phenolic-oxygen bonds. PDA can adhere to various material surfaces, and can also enhance the stability of secondary modification. In addition, PDA exhibits excellent reducibility and adhesion. PDA can be produced through the following simple process: a PDA coating can be formed merely by immersing a material in a weakly-alkaline Tris-HCl buffer or another weakly-alkaline aqueous solution of dopamine (DA) without an organic solvent. Therefore, DA can be utilized to functionalize a surface of a membrane material. For example, DA can be coated on a ceramic membrane to modify a surface functional group. Moreover, DA can be compounded with other metal ions or metal oxides and then subjected to one-step carbonization to produce carbon/nitrogen-encapsulated metal catalysts with excellent catalytic activity. Therefore, the modification of a ceramic membrane surface with DA and the loading of a cobalt salt on the ceramic membrane surface is expected to provide abundant loading sites for cobalt while anchoring the cobalt salt, which can enhance the adhesion between cobalt and the membrane surface and prevent the aggregation and loss of cobalt. However, there are many uncertainties regarding the binding mechanism of DA to a membrane surface, the loading mode of a cobalt source, and the corresponding catalytic performance for the hydrogenation of p-nitrophenol.

SUMMARY

In view of the problem that the conventional catalysts for hydrogenation of p-nitrophenol to produce p-aminophenol most rely on precious metals, have high costs, and are difficult to recover, the present disclosure provides a preparation method of a Co@CM multi-channel ceramic catalytic membrane for hydrogenation of p-nitrophenol.

In order to achieve the above objective, the present disclosure adopts the following technical solutions:

The present disclosure effectively avoids the agglomeration of metals based on the carbonization of organic matters during the pyrolysis of DA, and leads to uniformly-dispersed metal nanoparticles with a small particle size by adjusting various parameters in a preparation process. Based on the principle that nanoparticles encapsulated by carbon and nitrogen produced after one-step carbonization can effectively inhibit the loss of an active component during a reaction process, DA is further used in a catalytic membrane to synthesize a Co@CM multi-channel ceramic catalytic membrane rich in active sites. The Co@CM multi-channel ceramic catalytic membrane is also used in a reaction for hydrogenation of p-nitrophenol to produce p-aminophenol.

A preparation method of a Co@CM multi-channel ceramic catalytic membrane for hydrogenation of p-nitrophenol is provided, including the following specific steps:

step 1, dissolving tris(hydroxymethyl)aminomethane (Tris) in deionized water to produce a solution I;

step 2, slowly adding dilute hydrochloric acid dropwise to the solution I for pH adjustment to produce a solution II;

step 3, adding DA to the solution II, and stirring to produce a solution III;

step 4, adding the solution III to a forced circulation convection device; and under an action of a peristaltic pump or another power device, making the solution III fill various channels of a ceramic membrane tube and then undergo a forced flow through the ceramic membrane tube from inside to outside to allow a continuous forced circulation convection of the solution III, such that the DA is loaded in situ on a surface and in pores of the ceramic membrane tube;

step 5, oven-drying a ceramic membrane tube produced in the step 4 to produce a DA-modified ceramic membrane tube;

step 6, dissolving cobalt nitrate hexahydrate in methanol to produce a solution IV;

step 7, adding the solution IV to a storage tank of the forced circulation convection device, and repeating the operation in the step 4 to make cobalt ions loaded in situ on a surface and in pores of the DA-modified ceramic membrane tube;

step 8, oven-drying a ceramic membrane tube produced in the step 7 to produce a cobalt salt-loaded ceramic membrane tube;

step 9, subjecting a ceramic membrane tube produced in the step 8 to calcination-reduction in a tube furnace; and step 10, placing a catalytic membrane tube produced in the step 9 in a forced circulation device, rinsing the catalytic membrane tube through a forced circulation of an ethanol-water mixed solution, and air-drying naturally to produce the stable Co@CM multi-channel ceramic catalytic membrane.

Preferably, a concentration of the tris(hydroxymethyl) aminomethane in the solution I prepared in the step 1 is 0.05 mol/L to 0.2 mol/L.

Preferably, a pH of the solution II prepared in the step 2 is 8.0 to 9.0.

Preferably, a concentration of the DA in the solution III prepared in the step 3 is 2.0 g/L to 4.0 g/L.

Preferably, in the step 4, during the process of loading the DA in situ, a flow rate of the solution III is controlled at 3 L/h to 5 L/h by the forced circulation convection device, a temperature of a water bath is 20° C. to 40° C., and a time of the modification loading is 12 h to 36 h.

Preferably, in the step 5 and the step 8, the oven-drying is conducted for 12 h to 36 h at 50° C. to 70° C.

Preferably, a concentration of the cobalt nitrate hexahydrate in the solution IV prepared in the step 6 is 0.05 mol/L to 0.5 mol/L.

Preferably, in the step 7, during the process of loading cobalt in situ, a flow rate of the solution IV is controlled at 3 L/h to 5 L/h by the forced circulation convection device, a temperature of a water bath is 20° C. to 40° C., and a time of the loading is 12 h to 36 h.

Preferably, in the step 9, a calcination temperature is 600° C. to 800° C., a calcination atmosphere is argon, a heating rate is 2° C./min to 10° C./min, and the calcination temperature is held for 4 h to 6 h.

Preferably, in the step 10, the rinsing through the forced circulation of the ethanol-water mixed solution is conducted at a flow rate of 2 L/h to 5 L/h for at least 60 min, and a volume ratio of ethanol to water in the ethanol-water mixed solution is 1:3.

The catalytic membrane prepared above is used in hydrogenation of p-nitrophenol to produce p-aminophenol. The reaction is carried out in a flow-through membrane reactor. During the reaction, the membrane tube is fixed. A reaction mode is not limited, and an intermittent or continuous reaction mode can be adopted. A concentration of a reaction system or a reaction duration can be adjusted according to actual needs. The separation of a catalyst is not required throughout the catalytic reaction. After the catalytic reaction is completed, a resulting catalytic membrane can be taken out, washed, oven-dried, and then reused.

The present disclosure effectively prepares a DA-derived metal or metal oxide-carbon composite by regulating a DA concentration, a cobalt salt loading concentration, and a calcination temperature. The introduction of DA provides abundant loading sites to significantly increase the load capacity of Co and improve the catalytic activity, and can significantly enhance the binding of cobalt to the ceramic membrane to improve the stability of the catalytic membrane, thereby laying the foundation for industrial applications. Studies have revealed that a tightly-adherent PDA layer can be formed in situ on a surface and in pores of a multi-channel ceramic catalytic membrane during a DA modification process. According to a chemical structural formula of DA, DA includes hydroxyl and amino groups of catechol. Phenolic hydroxyl and amino groups on the benzene ring are highly-reactive functional groups. These functional groups enable a strong interaction with various materials through covalent or non-covalent bonds, and can bind to various metal ions through phenolic-oxygen bonds to serve as a bridge for the functionalization of materials, which provides a platform for the secondary modification of materials. In particular, the reductive carbonization during the pyrolysis of DA effectively avoids the agglomeration of metals. CN materials are gradually generated during the pyrolysis, which facilitates the conversion of the reactant. Studies have shown that $Co^{2+}$ can be reduced into Co by a reductive gas generated during the calcination of DA and thus serves as a catalytic active center. Thus, during the experiment, an in situ self-polymerization process and an in situ reduction process can be completed without requiring an additional reducing agent.

According to studies, one of the keys to improving the modification effect of DA and the performance of the catalytic membrane lies in the drying operation after the DA modification step and the cobalt loading step. The drying operation can remove the excess solvent to enhance the bonding between the ceramic membrane and the PDA layer, and also facilitates the loading of free cobalt ions to enhance the stability of the catalytic active substance on the ceramic membrane. In addition, the forced circulation technique has significant advantages over the conventional impregnation technique. In the forced circulation technique, an external pressure is applied to force both a modification substance and a catalytic active substance to pass through a surface and pores of a multi-channel ceramic membrane, which is more powerful and efficient than the traditional simple surface impregnation. A catalytic membrane prepared at an appropriate calcination temperature is conducive to promoting the contact between a reaction substrate and an active component and shortening the mass transfer pathway, thereby enhancing the reactivity. Results show that, when a calcination temperature is 600° C. to 800° C., an impregnation concentration of cobalt nitrate hexahydrate is 0.05 mol/L to 0.5 mol/L, and a DA concentration is 2.0 g/L to 4.0 g/L, the multi-channel catalytic membrane prepared exhibits superior performance.

Compared with the prior art, the present disclosure has the following advantages and positive effects:

1. The catalytic membrane prepared by the present disclosure is a multi-channel ceramic catalytic membrane that is easy to be arranged and fixed. In addition, a plurality of channels in the catalytic membrane can support and stabilize each other, which allows a high flux, excellent stability, and a large specific surface area and can provide increased active sites.

2. The present disclosure proposes a drying operation after a DA modification step and a cobalt loading step, and the drying operation can effectively enhance a DA modification effect to improve the performance of the catalytic membrane. The drying operation can remove the excess solvent to enhance the bonding between the ceramic membrane and the PDA layer, and also facilitates the loading of free cobalt ions to enhance the stability of the catalytic active substance on the ceramic membrane.
3. The Co@CM multi-channel ceramic catalytic membrane prepared by the present disclosure has excellent stability. The catalytic membrane can still maintain prominent catalytic activity after continuously catalyzing a reaction for 300 min. A catalytic membrane recovered after a long-time reaction has the same active component content as the fresh catalyst, and can exhibit a catalytic effect that does not change significantly. Therefore, the catalytic membrane prepared by the present disclosure solves the problems such as heavy loss, difficult separation, and poor stability faced by the traditional fine-grained precious metal catalysts, and has a promising industrial application prospect.

Reference numerals: 1—thermostatic water bath, 2—external circulation peristaltic pump, 3—internal circulation peristaltic pump, 4—storage-tank jacket, 5—storage tank, 6—membrane-reactor jacket, 7—membrane module, 8—pressure gauge, 9—feed pipeline, 10—external circulation outlet pipe, 11—normally closed exhaust valve, and 12—sampling port.

DETAILED DESCRIPTION OF THE EMBODIMENTS

To make the objectives, features, and advantages of the present disclosure comprehensible, the present disclosure will be further described below with reference to the specific embodiments. It should be noted that the embodiments of the present disclosure and the features in the embodiments may be combined with each other in case of no conflict.

In the following description, many specific details are set forth in order to facilitate the full understanding of the present disclosure, but the present disclosure can also be implemented in other ways other than those described herein. Therefore, the present disclosure is not limited by the specific embodiments disclosed below.

Example 1

A specific preparation process of a Co@CM multi-channel ceramic catalytic membrane was provided in this example.

Figure 1:
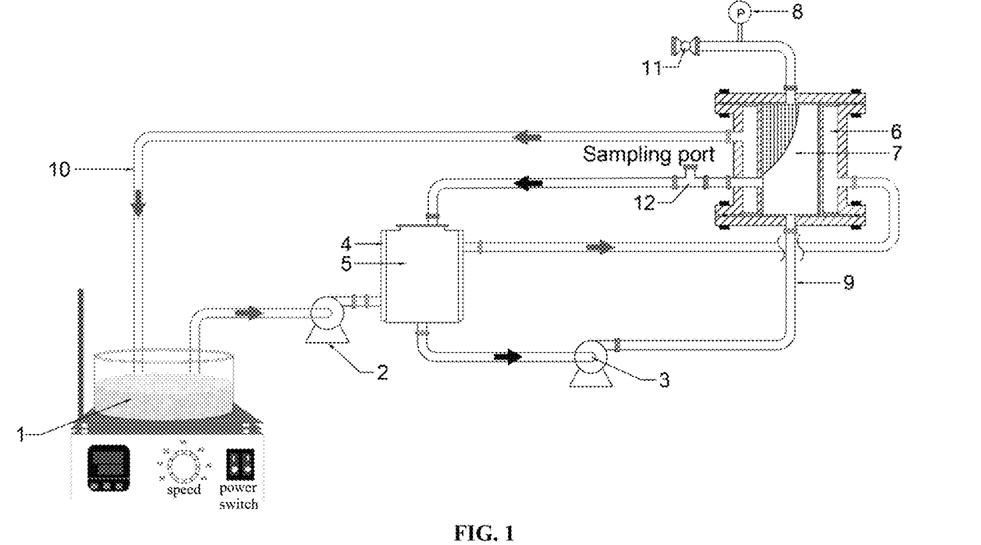
FIG. 1 is a schematic diagram of a forced circulation device adopted in Example 1.

In this example and the following examples, the preparation of a catalytic membrane and the subsequent reaction were carried out with the following device. It should be noted that the preparation of a catalytic membrane and the subsequent reaction may also be carried out with other devices. This example provides only one device capable of achieving both the preparation of a catalytic membrane and the subsequent reaction, and retains the possibility of other devices capable of implementing the technical solutions of the present disclosure. The designs of other devices are not defined here. FIG. 1 shows the entire device that can achieve the preparation and performance evaluation for the catalytic membrane in each example. The entire device includes a temperature control system, a power system, a pressure detection system, a storage tank, a membrane reactor assembly, a sampling port, a pipeline, etc. The entire device includes internal and external two circulation systems. An external circulation system is a thermostatic water circulation with a temperature control component as a core and thermostatic water bath 1 as a starting position. An internal circulation system is a material circulation with the storage tank 5 and the membrane reactor assembly 7 as a core and the storage tank 5 as a starting position. The internal and external circulation systems are separated by a hollow jacket structure in membrane module 7 and the storage tank 5. Upper and lower ends of the hollow jacket structure are connected with an inlet and an outlet of the thermostatic water circulation, respectively. External circulation peristaltic pump 2 and internal circulation peristaltic pump 3 provide power for the entire device. The external circulation peristaltic pump 2 pumps thermostatic water in the thermostatic water bath 1 out to flow into a water inlet of storage-tank jacket 4, then flow into a water inlet of membrane-reactor jacket 6 from a water outlet of the storage-tank jacket 4, then flow out from a membrane reactor, flow through external circulation outlet pipe 10, and return to the thermostatic water bath 1. A temperature of a reaction system is controlled by setting a temperature of the thermostatic water bath 1. The internal circulation system includes the storage tank 5 and the membrane reactor as a core. Starting from the storage tank 5, a material solution is pressurized and then pumped by the internal circulation peristaltic pump 3 into the membrane reactor, and is forced to flow through an inside of the membrane reactor and then return to the storage tank 5 through the sampling port from an outlet of the membrane reactor. In the membrane reactor, a catalytic ceramic membrane tube is fixed through the membrane module 7. Upper and lower ends of the membrane module 7 are hollow cylindrical rings, and a structure of a middle part of the membrane module can be cage-shaped, grid-shaped, fence-shaped, etc., which facilitates the outflow of a material. The upper and lower ends of the membrane module 7 both are open. The multi-channel ceramic membrane tube is placed in through an opening of the upper end or the lower end of the membrane module 7. A rubber ring is sleeved at two ends of the multi-channel ceramic membrane tube to fix the multi-channel ceramic membrane tube in the membrane module 7 and also play a sealing role. A flange is arranged at upper and lower ends of the multi-channel ceramic membrane tube and fixed on the membrane module 7 by a quick-release clamp. A lower opening of the membrane module 7 communicates with material feed pipeline 9 as a feed port. A side of the membrane module 7 communicates with a material discharge pipeline as a discharge port. A top opening of the membrane module 7 communicates with an evacuation pipeline as a pressure relief port. The sampling port 12 is formed on a material outlet pipe. Pressure gauge

8 is provided on the evacuation pipeline at an upper end of the membrane reactor. Normally closed exhaust valve 11 is provided at an outer side of the pressure gauge 8. When the membrane reactor needs to be sealed as a whole, the normally closed exhaust valve 11 is closed.

A process of preparing a multi-channel ceramic membrane with the above device was as follows:

300 mL of a tris(hydroxymethyl)aminomethane aqueous solution (solution I) with a concentration of 0.1 mol/L was prepared, then 0.01 mol/L dilute hydrochloric acid was slowly added dropwise to the solution I for adjusting a pH of the solution to 8.5, and then 0.9 g of DA was added at a concentration of 3.0 g/L. A multi-channel ceramic membrane tube was then filled in the membrane module. The prepared DA-containing Tris-HCl buffer solution was poured into the storage tank of the device. A flow rate was adjusted to 4 L/h, and the DA-containing Tris-HCl buffer solution was forced to flow through membrane pores. A modification temperature was controlled at 30° C., and a modification time was controlled at 16 h. After the modification was completed, a resulting membrane tube was taken out and dried in a 60° C. oven for 24 h to produce a sample denoted as DA@CM-3.0.

300 mL of a solution of 0.1 mol/L $Co(NO_3)_2 \cdot 6H_2O$ in methanol was prepared. The DA@CM-3.0 multi-channel ceramic membrane tube was refilled in the membrane module. The prepared solution of $Co(NO_3)_2 \cdot 6H_2O$ in methanol was added to the storage tank. A flow rate was adjusted to 4 L/h, and the solution of $Co(NO_3)_2 \cdot 6H_2O$ in methanol was forced to flow through membrane pores. A modification temperature was controlled at 30° C., and a modification time was controlled at 16 h. After the modification was completed, a resulting membrane tube was taken out and dried in a 60° C. oven for 24 h to produce a sample denoted as Co@CM-3.0-0.1 for later use.

The prepared multi-channel ceramic membrane tube Co@CM-3.0-0.1 was placed in a crucible, and the crucible was placed in a tube furnace to allow high-temperature calcination. The calcination was conducted as follows: in an argon (Ar) atmosphere, the multi-channel ceramic membrane tube was heated at 5° C./min from room temperature to a target temperature (700° C.) and then kept at the target temperature for 5 h. A resulting sample was naturally cooled to room temperature to produce a black catalytic membrane. The catalytic membrane was placed in a forced circulation device, rinsed with an ethanol-water mixed solution for 60 min, and then air-dried naturally to produce the Co@CM multi-channel ceramic catalytic membrane. A flow rate of the ethanol-water mixed solution was controlled at 3 L/h by adjusting a rotational speed of a peristaltic pump. In the ethanol-water mixed solution, a volume ratio of ethanol to water was 1:3. The Co@CM multi-channel ceramic catalytic membrane was denoted as Co@CM-3.0-0.1-700. In order to characterize and verify the catalytic performance of the catalytic membrane, a plurality of catalytic membranes were prepared under the same conditions in this example.

The catalytic membrane Co@CM-3.0-0.1-700 was used in an experiment for hydrogenation of p-nitrophenol to produce p-aminophenol. A reaction was carried out in the flow-through membrane reactor. The thermostatic water bath and the peristaltic pump 2 were turned on, and a rotational speed of the peristaltic pump 2 was set to 30 r/min, so as to implement the external water circulation system. A 30° C. water bath was adopted to stabilize a reaction temperature. After the peristaltic pump 2 ran for 5 min, 1 g of p-nitrophenol was added to a mixed solvent of ethanol and deionized water (250 mL, a volume ratio of ethanol to deionized water was 1:11.5) to prepare a reaction solution, and the reaction solution was stirred for 10 min. 0.4 mL of the reaction solution was taken as an initial sample. Then 3.92 g of $NaBH_4$ was added, and stirring was conducted for 10 min. A resulting reaction solution was then added to the storage tank of the flow-through membrane reactor. The peristaltic pump 3 was turned on, and a flow rate of the reaction solution was controlled at 4 L/h, so as to implement the internal circulation system. When the reaction solution flowed back to the storage tank through the peristaltic pump, the timing was started. 0.4 mL of a reaction solution was collected every 10 min (for the initial operation, the sampling time interval could be shortened). After the reaction was completed, a reaction solution was full evacuated, and deionized water was added to the storage tank. The peristaltic pump 2 was turned on, and forced circulation was allowed for 20 min to 30 min to remove the residual material solution on the catalytic membrane. After the rinsing was completed, a resulting catalytic membrane tube was taken out, oven-dried, and stored for the next reaction. A flow rate for the rinsing was not limited and could be the same as the flow rates in the catalytic membrane preparation and the catalytic reaction, such as 4 L/h. A composition of a product was detected by high-performance liquid chromatography (HPLC, Agilent 1200). The conversion and selectivity of the reaction were then calculated according to a standard curve. When a molar ratio of p-nitrophenol to sodium borohydride was 1:9.6, a concentration of p-nitrophenol was 28.8 mM, a reaction temperature was 30° C., and a material flow rate was 4 L/h, the conversion was 100% and the selectivity was 100% after 20 min of the reaction.

With the device shown in FIG. 1, cobalt, as a catalytic active component, can be forced to pass through pores and an inside of a ceramic membrane, which greatly improves the cobalt load capacity compared with the traditional impregnation technique. Cobalt, as a catalytic active site, can efficiently catalyze the hydrogenation of p-nitrophenol to produce p-aminophenol. As a result, an efficient in situ reduction process can be achieved.

Figure 2:
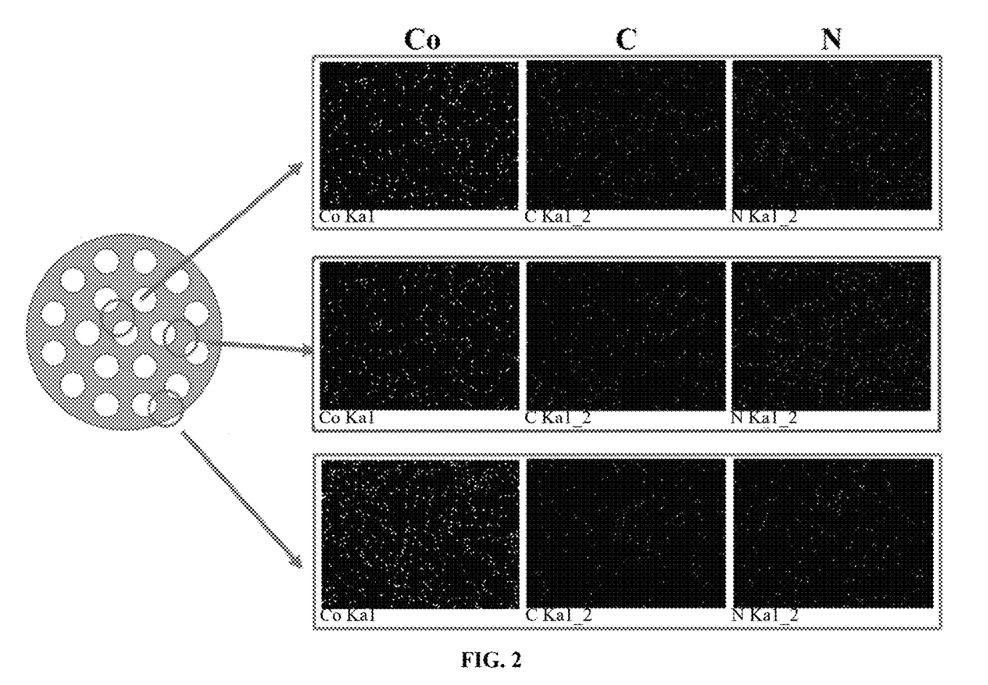
FIG. 2 shows energy-dispersive X-ray spectroscopy (EDX) results of the Co@CM multi-channel ceramic catalytic membrane in Example 1.

FIG. 2 shows EDX results of the multi-channel ceramic catalytic membrane Co@CM-3.0-0.1-700 prepared in this example. The distribution of Co, C, and N is detected in each region of the multi-channel ceramic catalytic membrane Co@CM-3.0-0.1-700, indicating that the Co@PDA-derived Co@CN has been successfully loaded on each part of a multi-channel ceramic membrane through the forced circulation with the help of excellent reduction and anchoring effects of PDA, that is, a multi-channel Co@CM catalytic membrane has been successfully prepared.

Figure 3:
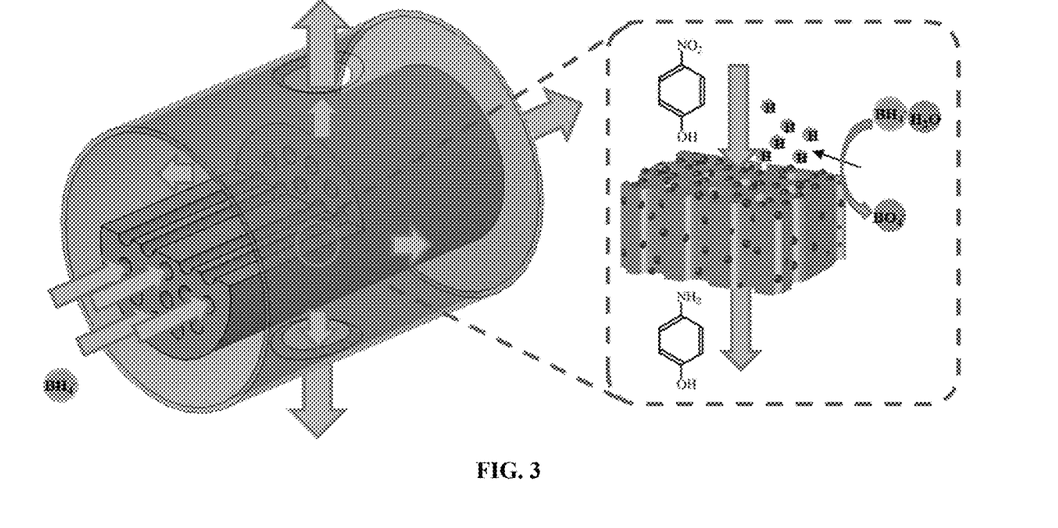
FIG. 3 shows a reaction mechanism of the Co@CM multi-channel ceramic catalytic membrane in Example 1.

FIG. 3 shows a reaction mechanism of the catalytic membrane Co@CM-3.0-0.1-700 prepared in this example. At an initial stage of the reaction, p-nitrophenol and sodium borohydride are adsorbed on the catalytic membrane, and then the B-H bond breakage occurs at cobalt nanoparticles as active centers, which accelerates the transfer of active H and electrons from sodium borohydride to p-nitrophenol to produce p-aminophenol. A content of the active component for the activation of H has a great impact on the reduction of p-nitrophenol. The higher the cobalt content, the higher the conversion. The excellent bioadhesion of PDA promotes the uniform and stable dispersion of cobalt nanoactive centers in the catalytic membrane, which is conducive to the diffusion and transport of reactants. Therefore, the Co@CM catalytic membrane exhibits excellent catalytic activity in the hydrogenation of p-nitrophenol. In addition, the Co@CM catalytic membrane has high stability.

Example 2

Unless otherwise specified, a specific preparation process of a Co@CM ceramic catalytic membrane in this example was consistent with the specific preparation process in Example 1.

300 mL of a tris(hydroxymethyl)aminomethane aqueous solution (solution I) with a concentration of 0.05 mol/L was prepared, then 0.01 mol/L dilute hydrochloric acid was slowly added dropwise to the solution I for adjusting a pH of the solution to 8.0, and then 0.6 g of DA was added at a concentration of 2.0 g/L. A multi-channel ceramic membrane tube was then filled in the membrane module. The prepared DA-containing Tris-HCl buffer solution was poured into the storage tank of the device. A flow rate was adjusted to 3 L/h, and the DA-containing Tris-HCl buffer solution was forced to flow through membrane pores. A modification temperature was controlled at 20° C., and a modification time was controlled at 36 h. After the modification was completed, a resulting membrane tube was taken out and dried in a 50° C. oven for 34 h to produce a sample denoted as DA@CM-2.0.

300 mL of a solution of 0.05 mol/L $Co(NO_3)_2 \cdot 6H_2O$ in methanol was prepared. The DA@CM-2.0 multi-channel ceramic membrane tube was refilled in the membrane module. The prepared solution of $Co(NO_3)_2 \cdot 6H_2O$ in methanol was added to the storage tank. A flow rate was adjusted to 3 L/h, and the solution of $Co(NO_3)_2 \cdot 6H_2O$ in methanol was forced to flow through membrane pores. A modification temperature was controlled at 20° C., and a modification time was controlled at 12 h. After the modification was completed, a resulting membrane tube was taken out and dried in a 50° C. oven for 36 h to produce a sample denoted as Co@CM-2.0-0.05 for later use.

The prepared multi-channel ceramic membrane tube Co@CM-2.0-0.05 was placed in a crucible, and the crucible was placed in a tube furnace to allow high-temperature calcination. The calcination was conducted as follows: in an argon (Ar) atmosphere, the multi-channel ceramic membrane tube was heated at 2° C./min from room temperature to a target temperature (600° C.) and then kept at the target temperature for 6 h. A resulting sample was naturally cooled to room temperature to produce a black catalytic membrane. The catalytic membrane was placed in a forced circulation device, rinsed with an ethanol-water mixed solution in a volume ratio of 1:3 for 70 min at a flow rate of 2 L/h, and then air-dried naturally to produce a Co@CM multi-channel ceramic catalytic membrane denoted as Co@CM-2.0-0.05-600.

The catalytic membrane Co@CM-2.0-0.05-600 was used in an experiment for hydrogenation of p-nitrophenol to produce p-aminophenol. After the reaction was conducted for 20 min, the conversion was 95.3% and the selectivity was 100%.

Example 3

Unless otherwise specified, a specific preparation process of a Co@CM ceramic catalytic membrane in this example was consistent with the specific preparation process in Example 1.

300 mL of a tris(hydroxymethyl)aminomethane aqueous solution (solution I) with a concentration of 0.2 mol/L was prepared, then 0.01 mol/L dilute hydrochloric acid was slowly added dropwise to the solution I for adjusting a pH of the solution to 9.0, and then 1.2 g of DA was added at a concentration of 4.0 g/L. A multi-channel ceramic membrane tube was then filled in the membrane module. The prepared DA-containing Tris-HCl buffer solution was poured into the storage tank of the device. A flow rate was adjusted to 5 L/h, and the DA-containing Tris-HCl buffer solution was forced to flow through membrane pores. A modification temperature was controlled at 40° C., and a modification time was controlled at 12 h. After the modification was completed, a resulting membrane tube was taken out and dried in a 70° C. oven for 12 h to produce a sample denoted as DA@CM-4.0.

300 mL of a solution of 0.5 mol/L $Co(NO_3)_2 \cdot 6H_2O$ in methanol was prepared. The DA@CM-4.0 multi-channel ceramic membrane tube was refilled in the membrane module. The prepared solution of $Co(NO_3)_2 \cdot 6H_2O$ in methanol was added to the storage tank. A flow rate was adjusted to 5 L/h, and the solution of $Co(NO_3)_2 \cdot 6H_2O$ in methanol was forced to flow through membrane pores. A modification temperature was controlled at 40° C., and a modification time was controlled at 12 h. After the modification was completed, a resulting membrane tube was taken out and dried in a 70° C. oven for 12 h to produce a sample denoted as Co@CM-4.0-0.5.

The prepared multi-channel ceramic membrane tube Co@CM-4.0-0.5 was placed in a crucible, and the crucible was placed in a tube furnace to allow high-temperature calcination. The calcination was conducted as follows: in an argon (Ar) atmosphere, the multi-channel ceramic membrane tube was heated at 10° C./min from room temperature to a target temperature (800° C.) and then kept at the target temperature for 4 h. A resulting sample was naturally cooled to room temperature to produce a black catalytic membrane. The catalytic membrane was placed in a forced circulation device, rinsed with an ethanol-water mixed solution in a volume ratio of 1:3 for 60 min at a flow rate of 5 L/h, and then air-dried naturally to produce a Co@CM multi-channel ceramic catalytic membrane denoted as Co@CM-4.0-0.5-800.

The catalytic membrane Co@CM-4.0-0.5-800 was used in an experiment for hydrogenation of p-nitrophenol to produce p-aminophenol. After the reaction was conducted for 20 min, the conversion was 94.8% and the selectivity was 100%.

Example 4

In this example, the Co@CM-3.0-0.1-700 prepared in Example 1 was tested for catalytic stability.

Figure 4:
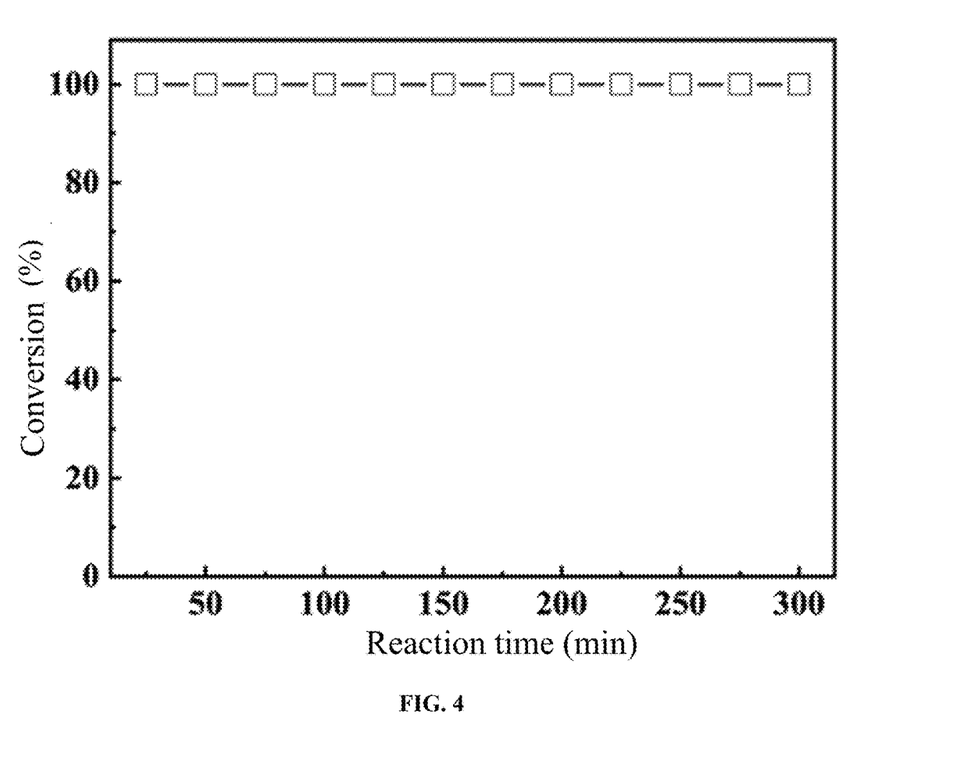
FIG. 4 shows results of stability testing for the Co@CM multi-channel ceramic catalytic membrane in Example 4.

The thermostatic water bath 1 and the peristaltic pump 2 were turned on, and a rotational speed of the peristaltic pump 2 was set to 30 r/min, so as to implement the external water circulation system. A 30° C. water bath was adopted to stabilize a reaction temperature. 10 g of p-nitrophenol was added to a mixed solvent of ethanol and deionized water (2,500 mL, a volume ratio of ethanol to deionized water was 1:11.5), and stirring was conducted for 10 min. 0.4 mL of a resulting reaction solution was taken as an initial sample. 3.92 g of $NaBH_4$ was added, and stirring was conducted for 10 min. When a temperature of a system was stabilized, according to a volume of the storage tank, a part of a resulting reaction solution was added to the storage tank 5 of the flow-through membrane reactor. The peristaltic pump 3 was turned on, and a flow rate of the peristaltic pump 3 was set to 4 L/h. A reaction solution flowing out from the storage tank 5 was pressurized by the peristaltic pump 3 and then flowed into the membrane module 7 through the feed pipeline 9, was forced to flow through the catalytic membrane in the membrane module 7, and then flowed out from the discharge port on a side of the reactor. A material solution produced after the reaction was discharged from the sampling port through the discharge pipeline and was no longer returned to the storage tank 5. The storage tank was open. When a reaction raw material in the storage tank was insufficient, a pre-prepared fresh reaction solution was poured into the storage tank through an opening to continue the reaction. When a reaction solution flowed out from the sampling port, the timing was started, and 0.4 mL of the reaction solution was collected every 10 min. After the reaction solution was exhausted, the peristaltic pump 2 and the peristaltic pump 3 were turned off. Deionized water was then added to the storage tank. The peristaltic pump 2 was turned on, and forced circulation was allowed for 20 min to 30 min to remove the residual material solution on the catalytic membrane. After the rinsing was completed, a resulting catalytic membrane tube was taken out, oven-dried at 40° C. to 50° C., and stored. It was tested that, after continuously catalyzing a reaction for 300 min, the catalytic membrane could still maintain high activity with no obvious deactivation. Specific results were shown in FIG. 4.

Comparative Example 1

300 mL of a tris(hydroxymethyl)aminomethane aqueous solution (solution I) with a concentration of 0.1 mol/L was prepared, then 0.01 mol/L dilute hydrochloric acid was slowly added dropwise to the solution I for adjusting a pH of the solution to 8.5, and then 0.15 g of DA was added at a concentration of 0.5 g/L. A multi-channel ceramic membrane tube was then filled in the membrane module. The prepared DA-containing Tris-HCl buffer solution was poured into the storage tank of the device. A flow rate was adjusted to 4 L/h, and the DA-containing Tris-HCl buffer solution was forced to flow through membrane pores. A modification temperature was controlled at 30° C., and a modification time was controlled at 16 h. After the modification was completed, a resulting membrane tube was taken out and dried in a 60° C. oven for 24 h to produce a sample denoted as DA@CM-0.5.

300 mL of a solution of 0.1 mol/L $Co(NO_3)_2 \cdot 6H_2O$ in methanol was prepared. The DA@CM-0.5 multi-channel ceramic membrane tube was refilled in the membrane module. The prepared solution of $Co(NO_3)_2 \cdot 6H_2O$ in methanol was added to the storage tank. A flow rate was adjusted to 4 L/h, and the solution of $Co(NO_3)_2 \cdot 6H_2O$ in methanol was forced to flow through membrane pores. A modification temperature was controlled at 30° C., and a modification time was controlled at 16 h. After the modification was completed, a resulting membrane tube was taken out and dried in a 60° C. oven for 24 h to produce a sample denoted as Co@CM-0.5-0.1.

The prepared multi-channel ceramic membrane tube Co@CM-0.5-0.1 was placed in a crucible, and the crucible was placed in a tube furnace to allow high-temperature calcination. The calcination was conducted as follows: in an argon (Ar) atmosphere, the multi-channel ceramic membrane tube was heated at 5° C./min from room temperature to a target temperature (700° C.) and then kept at the target temperature for 5 h. A resulting sample was naturally cooled to room temperature to produce a black catalytic membrane. The catalytic membrane was placed in a forced circulation device, rinsed with an ethanol-water mixed solution in a volume ratio of 1:3 for 60 min at a flow rate of 3 L/h, and then air-dried naturally to produce a Co@CM multi-channel ceramic catalytic membrane denoted as Co@CM-0.5-0.1-700.

The catalytic membrane Co@CM-0.5-0.1-700 was used in an experiment for hydrogenation of p-nitrophenol to produce p-aminophenol. After the reaction was conducted for 20 min, the conversion was 42.0% and the selectivity was 100%.

Comparative Example 2

300 mL of a tris(hydroxymethyl)aminomethane aqueous solution (solution I) with a concentration of 0.1 mol/L was prepared, then 0.01 mol/L dilute hydrochloric acid was slowly added dropwise to the solution I for adjusting a pH of the solution to 8.5, and then 0.9 g of DA was added at a concentration of 3.0 g/L. A multi-channel ceramic membrane tube was then filled in the membrane module. The prepared DA-containing Tris-HCl buffer solution was poured into the storage tank of the device. A flow rate was adjusted to 4 L/h, and the DA-containing Tris-HCl buffer solution was forced to flow through membrane pores. A modification temperature was controlled at 30° C., and a modification time was controlled at 16 h. After the modification was completed, a resulting membrane tube was taken out and dried in a 60° C. oven for 24 h to produce a sample denoted as DA@CM-3.0.

300 mL of a solution of 1.0 mol/L $Co(NO_3)_2 \cdot 6H_2O$ in methanol was prepared. The DA@CM-3.0 multi-channel ceramic membrane tube was refilled in the membrane module. The prepared solution of $Co(NO_3)_2 \cdot 6H_2O$ in methanol was added to the storage tank. A flow rate was adjusted to 4 L/h, and the solution of $Co(NO_3)_2 \cdot 6H_2O$ in methanol was forced to flow through membrane pores. A modification temperature was controlled at 30° C., and a modification time was controlled at 16 h. After the modification was completed, a resulting membrane tube was taken out and dried in a 60° C. oven for 24 h to produce a sample denoted as Co@CM-3.0-1.0.

The prepared multi-channel ceramic membrane tube Co@CM-3.0-1.0 was placed in a crucible, and the crucible was placed in a tube furnace to allow high-temperature calcination. The calcination was conducted as follows: in an argon (Ar) atmosphere, the multi-channel ceramic membrane tube was heated at 5° C./min from room temperature to a target temperature (700° C.) and then kept at the target temperature for 5 h. A resulting sample was naturally cooled to room temperature to produce a black catalytic membrane. The catalytic membrane was placed in a forced circulation device, rinsed with an ethanol-water mixed solution in a volume ratio of 1:3 for 60 min at a flow rate of 3 L/h, and then air-dried naturally to produce a Co@CM multi-channel ceramic catalytic membrane denoted as Co@CM-3.0-1.0-700.

The catalytic membrane Co@CM-3.0-1.0-700 was used in an experiment for hydrogenation of p-nitrophenol to produce p-aminophenol. After the reaction was conducted for 20 min, the conversion was 56.3% and the selectivity was 100%.

Comparative Example 3

300 mL of a tris(hydroxymethyl)aminomethane aqueous solution (solution I) with a concentration of 0.1 mol/L was prepared, then 0.01 mol/L dilute hydrochloric acid was slowly added dropwise to the solution I for adjusting a pH of the solution to 8.5, and then 0.9 g of DA was added at a concentration of 3.0 g/L. A multi-channel ceramic membrane tube was then filled in the membrane module. The prepared DA-containing Tris-HCl buffer solution was poured into the storage tank of the device. A flow rate was adjusted to 4 L/h, and the DA-containing Tris-HCl buffer solution was forced to flow through membrane pores. A modification temperature was controlled at 30° C., and a modification time was controlled at 16 h. After the modification was completed, a resulting membrane tube was taken out and dried in a 60° C. oven for 24 h to produce a sample denoted as DA@CM-3.0.

300 mL of a solution of 0.1 mol/L $Co(NO_3)_2 \cdot 6H_2O$ in methanol was prepared. The DA@CM-3.0 multi-channel ceramic membrane tube was refilled in the membrane module. The prepared solution of $Co(NO_3)_2 \cdot 6H_2O$ in methanol was added to the storage tank. A flow rate was adjusted to 4 L/h, and the solution of $Co(NO_3)_2 \cdot 6H_2O$ in methanol was forced to flow through membrane pores. A modification temperature was controlled at 30° C., and a modification time was controlled at 16 h. After the modification was completed, a resulting membrane tube was taken out and dried in a 60° C. oven for 24 h to produce a sample denoted as Co@CM-3.0-0.1.

The prepared multi-channel ceramic membrane tube Co@CM-3.0-0.1 was placed in a crucible, and the crucible was placed in a tube furnace to allow high-temperature calcination. The calcination was conducted as follows: in an argon (Ar) atmosphere, the multi-channel ceramic membrane tube was heated at 5° C./min from room temperature to a target temperature (1,000° C.) and then kept at the target temperature for 5 h. A resulting sample was naturally cooled to room temperature to produce a black catalytic membrane. The catalytic membrane was placed in a forced circulation device, rinsed with an ethanol-water mixed solution in a volume ratio of 1:3 for 60 min at a flow rate of 3 L/h, and then air-dried naturally to produce a Co@CM multi-channel ceramic catalytic membrane denoted as Co@CM-3.0-0.1-1000.

The catalytic membrane Co@CM-3.0-0.1-1000 was used in an experiment for hydrogenation of p-nitrophenol to produce p-aminophenol. After the reaction was conducted for 20 min, the conversion was 51.3% and the selectivity was 100%.

Comparative Example 4

Figure 5:
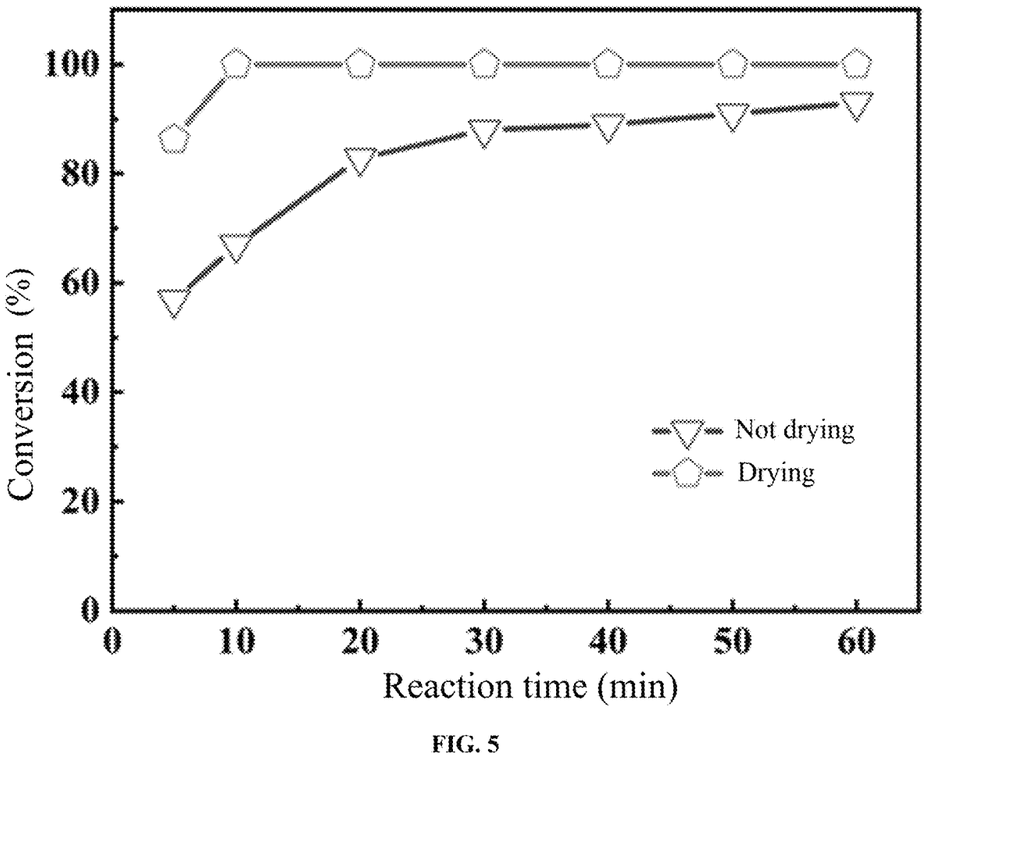
FIG. 5 shows the comparison of performance between the Co@CM multi-channel ceramic catalytic membranes produced with and without drying in Example 1 and Comparative Example 4.

This comparative example was the same as Example 1, except that, after the modification with the DA-containing Tris-HCl buffer solution and the modification with the solution of $Co(NO_3)_2 \cdot 6H_2O$ in methanol were completed, the oven-drying was not conducted. As shown in FIG. 5, whether a catalytic membrane produced after the key steps is dried in the preparation process has a great impact on the catalytic performance of the catalytic membrane. The drying process can remove the excess solvent to enhance the bonding between the ceramic membrane and the PDA layer, and also facilitates the loading of free cobalt ions to enhance the stability of the catalytic active substance on the ceramic membrane. The catalytic performance of the catalytic membrane produced after drying is significantly improved.

The above are only preferred examples of the present disclosure, and are not intended to limit the present disclosure in other forms. Any person skilled in the art may change or modify the technical content disclosed above into an equivalent example to be applied in other fields. Any simple amendment or equivalent change and modification of the above example made according to the technical essence of the present disclosure without departing from the content of the technical solutions of the present disclosure shall fall within the protection scope of the technical solutions of the present disclosure.

What is claimed is:

1. A preparation method of a Co@ceramic membrane (CM) multi-channel ceramic catalytic membrane for hydrogenation of p-nitrophenol, comprising the following steps:
   step 1, dissolving tris(hydroxymethyl)aminomethane in deionized water to produce a first solution;
   step 2, slowly adding a dilute hydrochloric acid solution dropwise to the first solution for pH adjustment to produce a second solution;
   step 3, adding dopamine (DA) to the second solution, and thoroughly mixing to produce a third solution;
   step 4, in a forced circulation device, allowing a forced circulation flow of the third solution through pores and walls of a 19-channel ceramic membrane tube to make the DA loaded in situ;
   step 5, oven-drying to produce a DA-modified 19-channel ceramic membrane tube;
   step 6, dissolving cobalt nitrate hexahydrate in methanol to produce a fourth solution;
   step 7, allowing a forced circulation flow of the fourth solution through pores and walls of the DA-modified 19-channel ceramic membrane tube to make a cobalt salt loaded in situ;
   step 8, oven-drying to produce a cobalt salt-loaded ceramic membrane tube;
   step 9, subjecting the cobalt salt-loaded ceramic membrane tube to calcination-reduction, wherein a calcination process allows an in situ reduction process to be completed without requiring an additional reducing agent; and
   step 10, rinsing pores and walls of a resulting membrane tube through a forced circulation of an ethanol aqueous solution, and air-drying naturally to produce the Co@CM multi-channel ceramic catalytic membrane;
   wherein a concentration of the DA in the third solution in the step 3 is 2.0 g/L to 4.0 g/L; a concentration of the cobalt nitrate hexahydrate in the fourth solution in the step 6 is 0.05 mol/L to 0.5 mol/L; and a calcination temperature in the step 9 is 600° C. to 800° C.;
   wherein in the step 1, a concentration of the tris(hydroxymethyl)aminomethane in the first solution is 0.05 mol/L to 0.2 mol/L;
   wherein in the step 2, a pH of the second solution is 8.0 to 9.0, and a concentration of the dilute hydrochloric acid solution is 0.1 mol/L;
   wherein in the step 4, a flow rate for the forced circulation flow of the third solution is 3 L/hour to 5 L/hour, and a time of the forced circulation flow is 12 hours to 36 hours; and a temperature controlled by the forced circulation device is 20° C. to 40° C.;
   wherein in the step 5 and the step 8, the oven-drying is conducted for 12 hours to 36 hours at 50° C. to 70° C.;
   wherein in the step 7, a flow rate for the forced circulation flow of the fourth solution is 3 L/hour to 5 L/hour, and a time of the forced circulation flow is 12 hours to 36 hours; and a temperature controlled by the forced circulation device is 20° C. to 40° C.;
   wherein in the step 9, a calcination atmosphere is argon, a heating rate is 2° C./min to 10° C./min, and the calcination temperature is held for 4 hours to 6 hours; and in the step 10, a flow rate for the forced circulation of the ethanol aqueous solution for the rinsing is 2 L/hour to 5 L/hour, the rinsing through the forced circulation is conducted for at least 60 min, and a volume ratio of ethanol to water is 1:3.

* * * * *